United States Patent
Wessman

(10) Patent No.: US 6,612,394 B2
(45) Date of Patent: Sep. 2, 2003

(54) STEERING CONTROL DEVICE FOR A VEHICLE AND METHOD FOR OPERATING SAID DEVICE

(75) Inventor: Bjorn Gosta Wessman, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,261

(22) Filed: Dec. 5, 2001

(65) Prior Publication Data

US 2002/0066616 A1 Jun. 6, 2002

(30) Foreign Application Priority Data

Dec. 6, 2000 (EP) .......................................... 00204348

(51) Int. Cl.[7] ................................................. B62D 5/99
(52) U.S. Cl. ............................ 180/446; 701/41; 701/72
(58) Field of Search ..................... 701/70, 72; 180/197, 180/446; 303/140, 146

(56) References Cited

U.S. PATENT DOCUMENTS

| | | | | |
|---|---|---|---|---|
| 5,228,757 A | * | 7/1993 | Ito et al. ....................... 303/146 |
| 5,864,769 A | * | 1/1999 | Inagaki et al. ................. 701/70 |
| 6,056,371 A | * | 5/2000 | Lin et al. ....................... 303/146 |
| 6,062,336 A | * | 5/2000 | Amberkar et al. ........... 180/443 |
| 6,089,680 A | | 7/2000 | Yoshioka ....................... 303/146 |
| 6,101,434 A | * | 8/2000 | Irie et al. ....................... 701/36 |
| 6,122,568 A | * | 9/2000 | Madau et al. .................. 701/1 |
| 6,122,584 A | * | 9/2000 | Lin et al. ....................... 701/70 |
| 6,131,688 A | * | 10/2000 | Fukada ......................... 180/408 |
| 6,208,921 B1 | * | 3/2001 | Tsunehara et al. ............. 701/41 |
| 6,216,079 B1 | * | 4/2001 | Matsuda ....................... 701/70 |
| 6,219,610 B1 | * | 4/2001 | Araki ........................... 701/72 |
| 6,276,766 B1 | * | 8/2001 | Yamada ....................... 303/154 |
| 6,324,446 B1 | * | 11/2001 | Brown et al. .................. 701/1 |
| 6,324,458 B1 | * | 11/2001 | Takagi et al. ................. 701/70 |
| 6,338,015 B1 | * | 1/2002 | Kawagoe et al. ............. 701/41 |
| 6,374,162 B1 | * | 4/2002 | Tanaka et al. ................. 701/1 |

FOREIGN PATENT DOCUMENTS

| | | |
|---|---|---|
| DE | 42-24-887 A1 | 9/1993 |
| EP | 0-943-515 A1 | 9/1989 |
| EP | 0 982-220 A | 3/2000 |

* cited by examiner

Primary Examiner—Lesley D. Morris
Assistant Examiner—L. Lum
(74) Attorney, Agent, or Firm—Gary A. Smith

(57) ABSTRACT

The invention relates to a steering control device for a vehicle, comprising a steering actuator, a pair of steerable wheels (1a, 1b) attached to the same wheel axle, a steering transmitting device connecting the steering actuator and the steerable wheels(1a, 1b), and a sensor (5) arranged to detect at least one parameter relating to a condition of the steering actuator and generate a signal indicative of said condition, which signal also categorizes each of the steerable wheels (1a, 1b) as an inside and an outside wheel respectively. The control device further comprises an electronic control unit (10) for a vehicle brake control system, which system is arranged to brake the inside wheel when a signal from the sensor (5) exceeds a predetermined value for a particular condition, in order to reduce the turning radius ($R_1$, $R_2$) of the vehicle. A method for operating the control system is also disclosed.

11 Claims, 4 Drawing Sheets

STEERING CONTROL DEVICE FOR A VEHICLE AND METHOD FOR OPERATING SAID DEVICE

BACKGROUND OF INVENTION

The invention relates to a steering control device for a vehicle, comprising a steering actuating means, such as a steering wheel, a pair of steerable wheels attached to the same wheel axle, means for transmitting steering impulses between the steering actuating means and the steerable wheels. The position of the steering actuating means is detected by a sensor means arranged in connection with the steering actuating means or the wheels, in order to generate a position signal proportional the steered angle of the wheels. The control device is connected to an electronic control unit for a vehicle brake control system, which system is arranged to brake the inside wheel when the position signal from the sensor means exceeds a predetermined value, in order to reduce the turning radius of the vehicle.

A common problem for front wheel drive cars having relatively large engines and/or wide tires, is a comparatively large turning circle. The problem may be worsened by other factors, such as a transversely mounted engines, a long wheelbase and impact absorbing beams, all combining to limit the available space for turning the front wheels.

Making the car body wider to accommodate the wheels is not always a possible solution, due to a combination of legal restrictions, practical reasons and the maximum width which would be accepted by consumers.

Known solutions to this problem involves making physical changes to the vehicle suspension, in order to temporarily or permanently move the pivot point for the steerable wheels towards the center of the turning radius, or cornering center. However, such a suspension arrangement optimized for a small minimum turning radius could, for instance, move the contact surface of the tire from the inner/center part to the outer part of the tire. A weight distribution of this kind would almost certainly have a negative effect on the handling of the vehicle at speed. Physically moving the pivot point, for instance by rebuilding the suspension so that the struts, rods and arms are attached to the wheel mounting inside the outer profile of the rim, may cause problems with the positioning and size of the brake calipers and the cooling of the brake discs, etc.

A further solution is to make all four wheels steerable, so that the rear wheels are turned in the opposite direction to the front wheels at low velocities. Although this has been tried and is practically possible, such systems are complex and add to the cost and total weight of the vehicle.

For multi-wheel or tracked vehicles the problem is simply solved by locking all wheels on one side of the vehicle. This would not be a possible solution for vehicles such as an automobile, as the tire wear would be excessive on tarmac or concrete surfaces.

SUMMARY OF INVENTION

According to one embodiment of the invention, the steering control device for a vehicle, comprises a steering actuating means, such as a steering wheel, a pair of steerable wheels attached to an axle, means for transmitting steering impulses between the steering actuating means and the steerable wheels. A sensor is arranged to detect at least one parameter relating to a condition of the steering actuator and generate a signal indicative of said condition, which signal also categorizes each of the steerable wheels as an inside and an outside wheel respectively. One condition detected by the sensor may be the position of the steering actuating means, in order to generate a position signal proportional the steered angle of the wheels. The control device also includes an electronic control unit for a vehicle brake control system, which system is arranged to brake the inside wheel when the -position signal from the sensor means exceeds a predetermined value, in order to reduce the turning radius of the vehicle.

The brake control system is actuated as the steering actuating means is approaching or actually reaches its end position. This usually occurs when the vehicle is stationary or is being turned at a relatively low speed, with the steering wheel turned to or near its limit position. However, it is also possible to prevent the system from operating if the vehicle velocity exceeds a predetermined value. In this way the braking action will only take place if the vehicle velocity is less than e.g. 10 km/h, preferably less than 7 km/h.

A further condition that can be detected by the sensor is the rate of turning of the steering means or actuator. For instance, in an emergency situation a driver may need to swerve suddenly to avoid an obstacle on the road. Such a sudden turning of the steering actuator is detected by the sensor and the inside wheel is braked briefly, in order to assist the driver in avoiding said obstacle. As an operation of this type usually involves turning the wheel in a first direction, to avoid an obstacle, and then in a second direction, to move the vehicle back to its original path, the steered wheels will be braked alternately. As this condition can occur at speeds higher than the velocities stated above, it is important that the brakes are only actuated for a short time and that a vehicle stability system, or a similar system can override this function.

In addition to a standard steering wheel, the above-mentioned steering actuating means can also be electrically controlled e.g. by a joystick or a system of push buttons. The steering transmitting means can either be a standard mechanical steering linkage or an electrically or electronically operated steering system also termed "steer-by-wire".

The steering control device also comprises an electronic control unit for the brake control system of the vehicle. This electronic control unit is of a type, which is provided in most modern vehicles and can be part of an anti-locking brake system a vehicle traction system or a vehicle stability control system. Common for all these systems is that they can control the vehicle brakes independently of the driver actuated control system, and that they prevent the wheels from locking during actuation of the brakes. The exact type of anti-locking control system used is, however, not relevant for the invention.

The invention also relates to a method for operating a steering control device as described above. As the steering actuating means approaches or reaches its end position, a signal is sent from the position sensor indicating that the driver requires the vehicle to turn sharply. The position signal is transmitted to the control device, which in turn transmits a signal to the electronic control unit for the vehicle brake control system. The brakes will then be actuated in such a way that the inside wheel is braked. The braking action causes a virtual displacement of the turning center of the inside wheel and reduces the turning radius of the vehicle.

BRIEF DESCRIPTION OF DRAWINGS

The invention will in the following be described in greater detail, with reference to the figures which are shown on the appended drawings. In the drawings.

These drawings are schematic and do not limit the scope of the invention.

DETAILED DESCRIPTION

Figure 1:
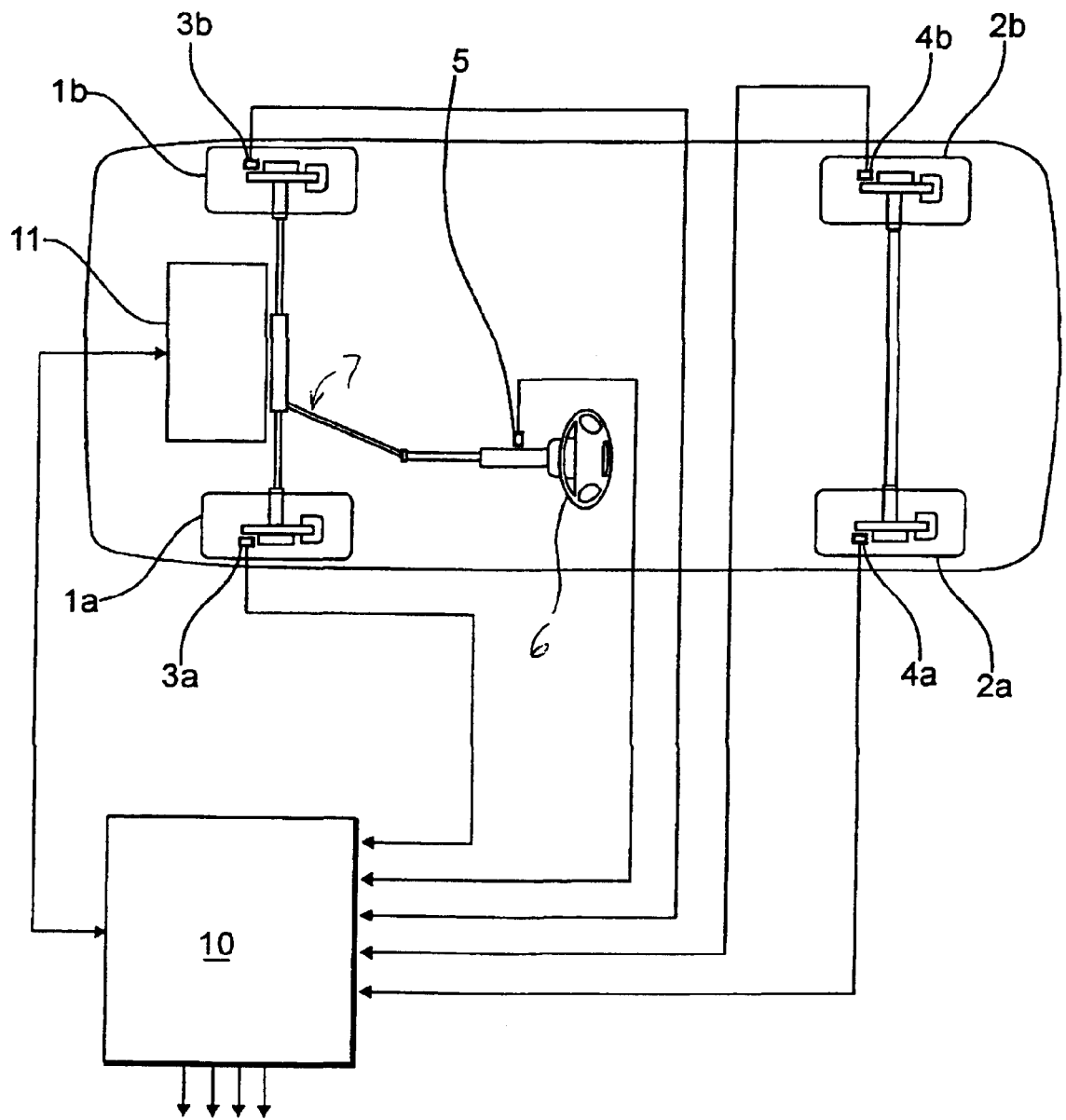
FIG. 1 shows a schematic view of a control system according to a first embodiment of the invention.

FIG. 1 shows a schematic view of a control system for a vehicle according to a first embodiment according to the invention. The vehicle is provided with two front steered wheels 1a, 1b and two rear wheels 2a, 2b, wherein each wheel is provided with a braking unit, e.g. a disc brake. Each wheel is also provided with a sensor 3a, 3b; 4a, 4b for detecting wheel rotation. These rotation sensors are part of the anti-locking brake system (ABS) or stability control system of the vehicle. The type of sensor used is not relevant to the invention. The signals generated by the sensors are used to determine if the vehicle is moving and, if so, at which velocity.

A further sensor 5 is arranged in connection with the steering actuating means, which in this case is a steering wheel 6. In a first embodiment this sensor 5 is used as a position sensor, measuring the position of the steering wheel 6 in order to determine the steering angle α of the steering wheel. This first steering angle α is proportional to a second steering angle β of the steered wheels 1a, 1b. In the preferred embodiment the steering wheel 6 is connected to the steered wheels 1a, 1b via a mechanical linkage 7, possibly via hydraulic components such as a power steering system.

In an alternative embodiment, the position sensor 5 may be placed adjacent a suitable part of the steering linkage 7, such as the pivot point of a steered wheel, in order to measure the actual steering angle β of the wheels directly.

Similarly, for electrically actuated steering systems a sensor could be placed near one of the steered wheels to measure the actual steering angle β. It is also possible to used a desired steering angle input from the driver, who may use a steering wheel, a joystick or some other signal generating actuator connected to a central steering control unit. Alternatively a steering angle signal transmitted from a steering control unit to a steering actuator for the steerable wheels may be used.

The signals from the rotation sensors 3a, 3b; 4a, 4b and the signal generated by the sensor 5 are transmitted to an electronic control unit (ECU) 10. The ECU 10 can be a separate unit or be integrated into a single unit for combined control of the vehicle ABS and/or stability system. In the preferred embodiment an integrated unit is used, which unit would also send and receive signals to and from the vehicle engine 11 and driveline (not shown).

The engine and driveline parameter signals can also be used for determining the vehicle velocity, using e.g. engine revolutions and gear selector position. This may be used as an alternative to, or as a back-up for, the wheel rotation sensors 3a, 3b; 4a, 4b.

In operation, the position signals transmitted to the ECU 10 from the sensor 5 are used to detect if the steering wheel is turned to a maximum limit position and in which direction the steering wheel has been turned. If the former condition is true, then ECU will use rotation the sensors 3a, 3b; 4a, 4b to determine whether the vehicle is stationary or moving. If the vehicle moves at a velocity less than a predetermined limit $v_{max}$, for example 7 km/h, the ECU 10 will transmit a signal to the brake actuator of the steered wheel on the side of the vehicle toward the inside of the turn. The braking force applied to said inside wheel is preferably less than or equal to the force that can be applied without activating the anti-locking function of the ABS. Both the steering wheel angle and the velocity are monitored during the procedure, which is ended as soon as the steering wheel is moved away from its maximum limit position or if the vehicle velocity v exceeds the predetermined limit $v_{max}$.

Although the preferred embodiment uses a triggering condition where the steering wheel angle α is at its maximum limit, it is also possible to use predetermined steering wheel angles smaller than the maximum value $\alpha_{max}$. In this way the position sensor 5 may trigger the system when the steering wheel angle α is 5–10° less than the maximum value $\alpha_{max}$. According to a further embodiment it is also possible to trigger the braking action gradually, as the steering wheel angle approaches its maximum angle $\alpha_{max}$. This will give a softer transition as the brake is applied on the inside wheel and may allow braking action to start at higher velocities, e.g. 10 km/h. Full braking action will, however, not take place until the velocity drops below the pre-set maximum value, i.e. when $v<v_{max}$.

Figure 2:
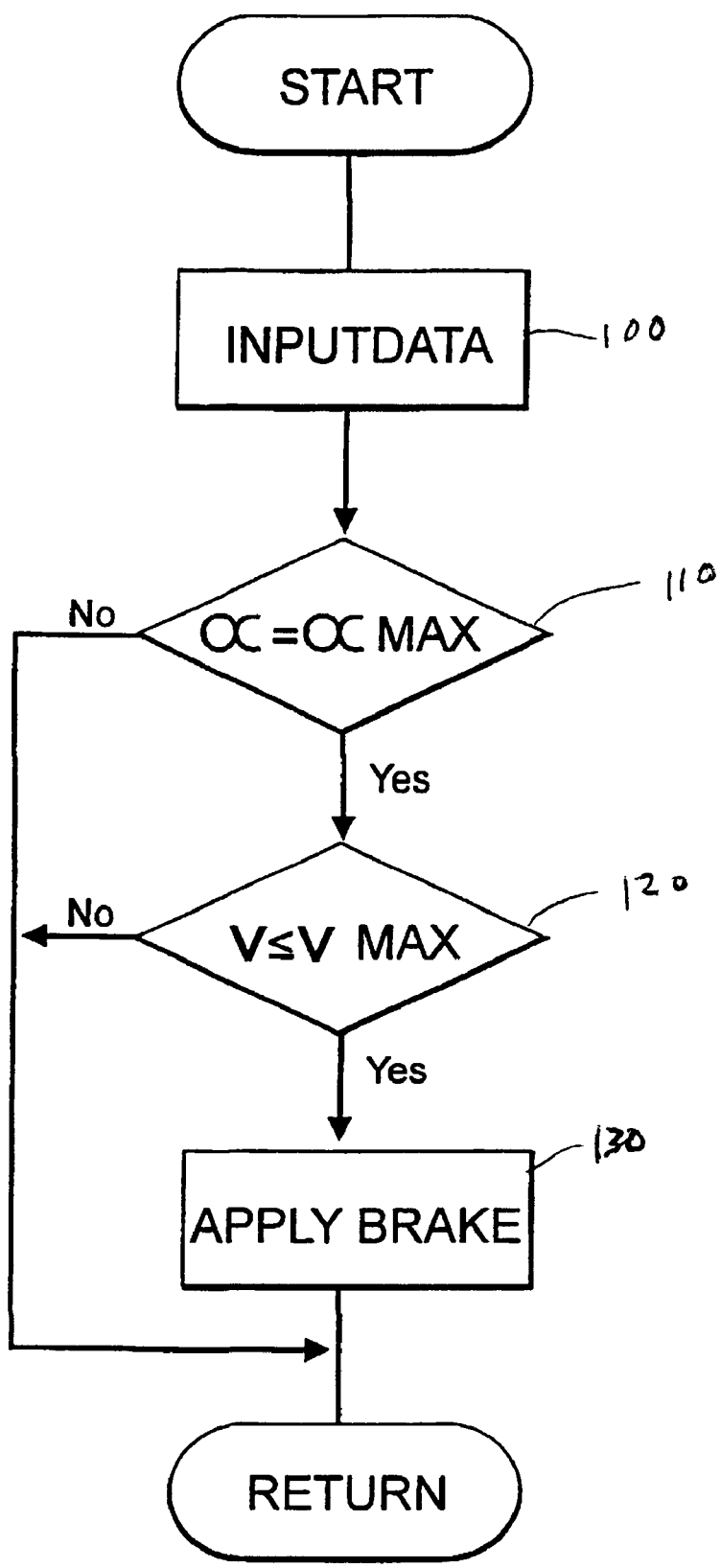
FIG. 2 shows a flow chart for the control system of FIG. 1.

FIG. 2 shows a flowchart in which the sequential steps of the system are described. According to a preferred embodiment, the system is triggered when the steering wheel angle or reached its maximum value $\alpha_{max}$. As soon as the system is started, a sampled set of data from the rotation sensors 3a, 3b; 4a, 4b and position sensor 5 are received by the ECU 10 (see FIG. 1). The steering wheel angle α—its direction and the vehicle velocity v, calculated from the rotation signal values, is inputted to the system at 100. In the next step 110, the system compares the actual steering wheel angle α with the maximum angle $\alpha_{max}$, to confirm that the steering wheel is still at its limit position. If this is true, the system, at step 120, compares the actual vehicle velocity v with a predetermined maximum value $v_{max}$ for the velocity, e.g. v≦7 km/h. When both conditions are fulfilled, the ECU transmits a signal to the brake actuator of the inside steered wheel, step 130.

If one or both conditions are false, the step for applying brakes is bypassed. The system then performs a loop back to the start, whereby a new set of data is sampled. The loop can be interrupted if the steering wheel angle α drops below a predetermined limit $\alpha_{lim}$, and/or if a set number of loops have been performed without the brakes being actuated.

Variations of this flow chart are possible depending on the selected limit conditions set for the angle α and the velocity v, as well as the conditions for starting the system. Examples of such conditions are initiation at an angle less than $\alpha_{max}$, or a gradual initiation of the brakes as the angle α and/or speed v reaches pre-set threshold values.

A further condition that can be detected by the sensor 5 is the rate of turning of the steering means or actuator. If the sensor 5 detects a sudden turning of the steering actuator, the inside wheel is braked briefly. As this condition can occur at almost any wheel angle α and at speeds higher than the velocities stated above, i.e. at $v_{max}$>10 km/h, it is important that the brakes are only actuated for a short time and/or that this function can be overridden by a vehicle stability system, or a similar system. The duration of brake actuation can be limited by a predetermined time interval or by ending brake actuation as soon as the rate of turn of the steering actuator drops below a predetermined value. Both these predetermined values are selected depending on factors such as the size or weight of the vehicle, or the absence or presence of an anti-locking brake or stability system. If a vehicle stability system is present it must be able to override the brake actuation if it detects that an impending or an actual brake actuation may have, or is causing, a negative effect on the roadholding of the vehicle.

Figure 3:
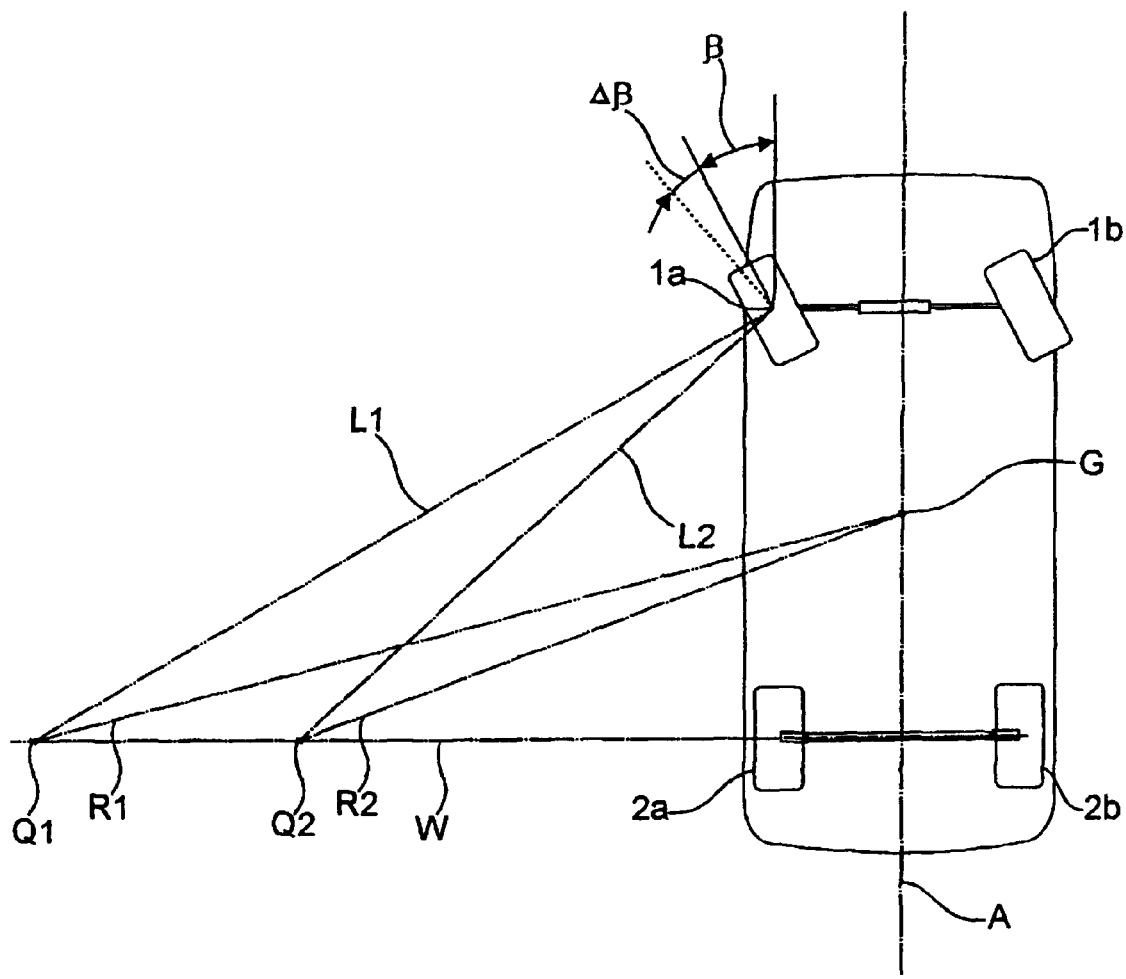
FIG. 3 shows a plan view describing the effect of said system on the turning radius of the vehicle, in relation to its center of gravity.

FIG. 3 shows how the turning radius is decreased by the steering control device. With the steerable wheels 1a, 1b deflected to their maximum steering angle β, a line $L_1$ is drawn perpendicular to the rolling direction of the inside wheel 1a. This line $L_1$ intersects a further line W, passing through the rear axle carrying the rear wheels 2a, 2b, at a point $Q_1$. The distance between the point $Q_1$ and the center of gravity G of the vehicle equals the minimum turning radius $R_1$ of a standard vehicle.

When a braking force is applied to the inside steerable wheel, the vehicle will be made to "over steer". This condition causes the vehicle to make a slightly sharper turn, as the maximum steering angle β has been increased by a small amount Δβ. This is illustrated by the line $L_2$ which is perpendicular to the new rolling direction of the inside wheel 1a. The line $L_2$ intersects the line W through the rear axle at a second point $Q_2$, inside the first point $Q_1$ The distance between the second point $Q_2$ and the center of gravity G is the new turning radius $R_2$. In the case of a large saloon car, the turning radius may be reduced by approximately 1 meter using this application.

Figure 4:
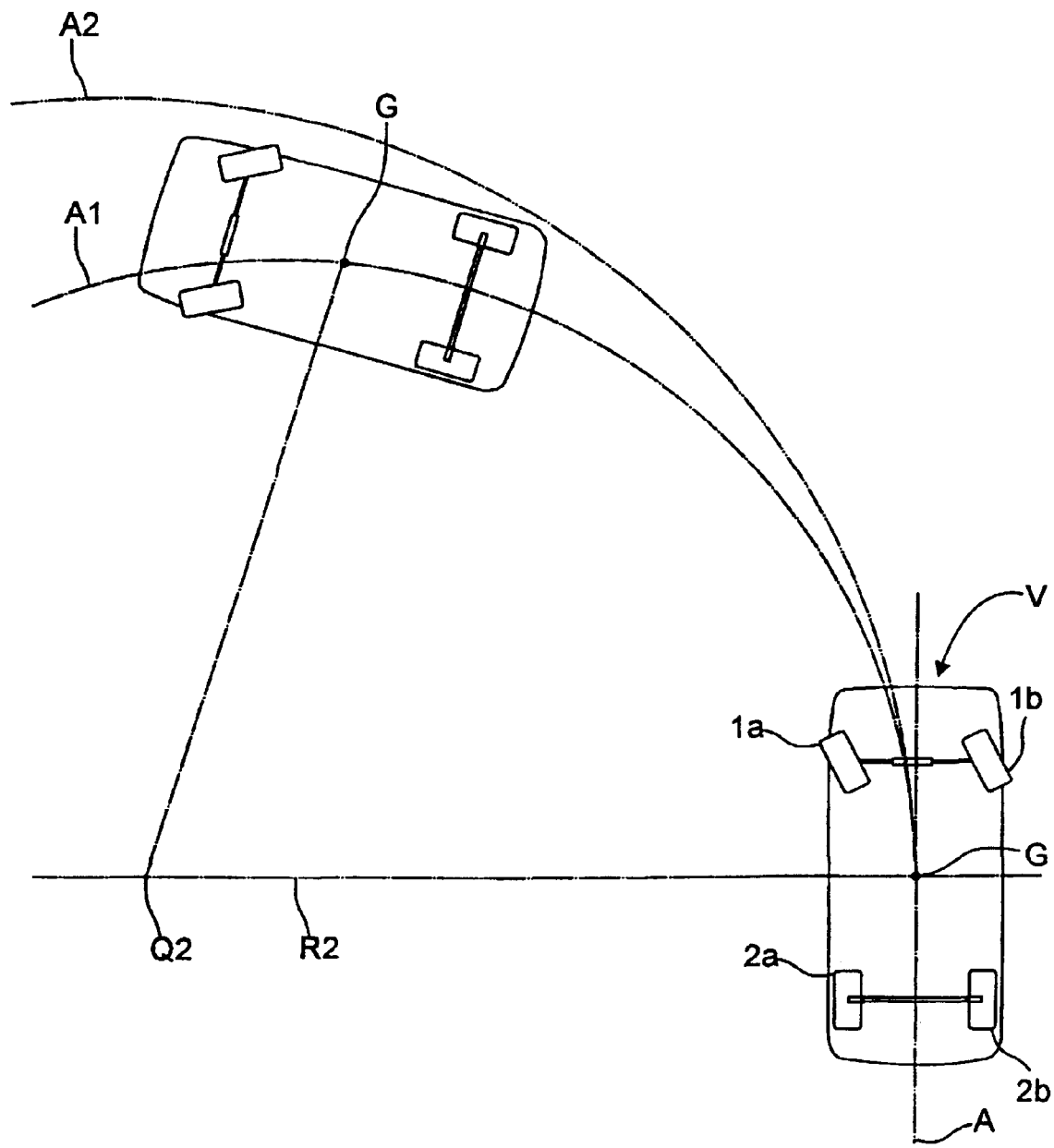
FIG. 4 shows a plan view describing the effect of said system on the cornering capability of the vehicle.

FIG. 4 illustrates how the vehicle would travel along a curve $A_1$ with the steering control device actuated, as compared to the curve $A_2$ without said system. In addition FIG. 4 clarifies what is meant by the term "over steer" and how it affects the movement of the vehicle. The scale of the different curves $A_1$ and $A_2$ in the Figure is exaggerated for clarity.

It may be noted that as the vehicle travels at low speed when the steering control device is actuated, it can be assumed that there will be no shift in the position of the center of gravity G caused by the inertia of the vehicle. It is therefore assumed that the center of gravity will remain in the same position on a longitudinal center line A through the vehicle.

Although the preferred embodiment comprises driven front wheels, either as a 2- or a 4-wheel drive, the invention will also work for rear-wheel driven vehicles.

What is claimed is:

1. A steering control device for reducing a turning radius of a vehicle having a steering actuator, a pair of steerable wheels, and a steering transmitting device connecting the steering actuator and the steerable wheels, and a vehicle brake control system, with the steering control device comprising a sensor arranged to detect the position of the steering actuator and to generate a steering position signal indicative of said position, with said vehicle brake control system receiving said steering position signal and braking the inside wheel when the steering position signal indicates that the steering actuator is approaching a maximum limit position.

2. The steering control device according to claim 1 wherein the sensor further generates a signal indicative of a rate of turning of the steering actuator and that the brake control system is actuated when the rate of turning exceeds a predetermined value.

3. The steering control device according to claim 1, in which the brake control system is actuated if a vehicle velocity is below a predetermined value.

4. The steering control device according to claim 3, in which the brake control system is actuated if the velocity is below 10 km/h.

5. The steering control device according to claim 1, in which said steering transmitting device is a mechanical steering linkage.

6. The steering control device according to claim 1, in which said steering transmitting device is an electrically controlled steering means.

7. A steering control device according to claim 1, in which the electronic control unit for the brake control system is part of an anti-locking brake system.

8. The steering control device according to claim 1, in which characterized the electronic control unit for the brake control system is part of a vehicle stability control system.

9. A method for operating a steering control device for a vehicle, which vehicle comprises a steering actuator, a pair of steerable wheels, a steering transmitting device connecting the steering actuator and the steerable wheels, and a position sensor for detecting the position of the steering actuator and for generating a signal indicative of said condition, the method characterized in that when a signal from the position sensor exceeds a predetermined maximum limit position, the control device activates an electronic control unit for a vehicle brake control system in order to brake the inside wheel, in order to reduce the turning radius of the vehicle.

10. The method for operating a steering control device according to claim 9, in which the position sensor further generates a signal indicative of a rate of turning of the steering actuator; with the brake control system being actuated when the rate of turning exceeds a predetermined value.

11. The method for operating a steering control device according to claim 9, wherein the brake control system is actuated if the vehicle velocity is below a predetermined value.

* * * * *